(12) United States Patent
Mayer-Steuernagel et al.

(10) Patent No.: US 6,509,820 B1
(45) Date of Patent: Jan. 21, 2003

(54) PRESSURE-SEALED MODULAR UNIT AND METHOD FOR THE PRODUCTION THEREOF

(75) Inventors: Wolfgang Mayer-Steuernagel, Roethenbach (DE); Lorand Rohay, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/242,192

(22) PCT Filed: Jun. 8, 1998

(86) PCT No.: PCT/DE98/01555
§ 371 (c)(1),
(2), (4) Date: Dec. 7, 1999

(87) PCT Pub. No.: WO98/57079
PCT Pub. Date: Dec. 17, 1998

(30) Foreign Application Priority Data

Jun. 10, 1997 (DE) .......................... 197 24 420

(51) Int. Cl.[7] .................................. H01F 7/00
(52) U.S. Cl. ...................... 335/278; 156/73.1
(58) Field of Search ............... 335/202, 278; 251/129.01–129.22; 156/73.1

(56) References Cited

U.S. PATENT DOCUMENTS 3,387,901 A * 6/1968 Williams .................. 308/217
4,155,606 A * 5/1979 Kispert et al. ............ 308/217

FOREIGN PATENT DOCUMENTS

| DE | 16 334 | 3/1960 |
| DE | 1 450 318 | 1/1969 |
| DE | 41 35 993 | 12/1992 |

OTHER PUBLICATIONS

*Industrial Plastics Calculate—Design—Use*, Jan. 1960, 6th Ed.*

* cited by examiner

Primary Examiner—Ramon M. Barrera
(74) Attorney, Agent, or Firm—Kenyon & Kenyon

(57) ABSTRACT

A pressure-tight unit, for example, a hydraulic unit having a functional unit placed in a housing, is provided. The housing has a recess, where the functional unit is placed. The functional unit has a cover plate made of thermoplastic material, which closes the recess in a pressure-tight manner. A gap is formed between the housing also made of thermoplastic material and the cover plate, where an insert can be placed, with which a pressure-tight joint can be formed between the housing and the cover plate. The pressure-tight joint is produced using for example ultrasonic welding, with a sonotrode of an ultrasonic welding system being placed on the insert.

6 Claims, 1 Drawing Sheet

PRESSURE-SEALED MODULAR UNIT AND METHOD FOR THE PRODUCTION THEREOF

The present invention relates generally to pressure-tight assemblies, particularly to a pressure-tight hydraulic assembly.

BACKGROUND INFORMATION

A conventional hydraulic unit is described in, for example, German Patent Application No. 195 21 510, where an electromagnetic actuator is placed into a housing made of thermoplastic material. The actuator also has a plastic housing part, which is joined to the housing by welding or gluing in a pressure-tight manner.

SUMMARY OF THE INVENTION

The present invention has the advantage that the pressure-tight joint can be produced by ultrasonic welding. A sonotrode advantageous for welding. need not vibrate a mass of the functional unit, e.g., a magnet of an electromagnetic actuator, but only a substantially smaller mass of an insert. In addition, the requirements concerning dimensional stability of the housing are less strict. The functional unit may be pre-assembled in the housing, positioned axially and radially, and tested for operability prior to welding.

The present invention provides further advantageous refinements and improvements. It is particularly advantageous if a cover is molded onto the functional unit and the connections for the functional unit are integrated in the cover. Furthermore, for the ultrasonic welding, it is advantageous that the insert be formed on the end face to be welded by two knife-shaped supports, one knife being in contact with the cover and the other knife being in contact with the housing on the gap surface. This ensures that the material deformed by ultrasonic welding can flow into the cavity formed between the knives. Another convenient design of the gap and the insert, whereby splashing, visible from the outside, of the material flowing during ultrasonic welding is avoided, is made possible by the insert having a wider outer ring and a narrower ring supported by the gap surface, the two knives for ultrasonic joining being formed on the narrower ring.

DETAILED DESCRIPTION

Figure 1:
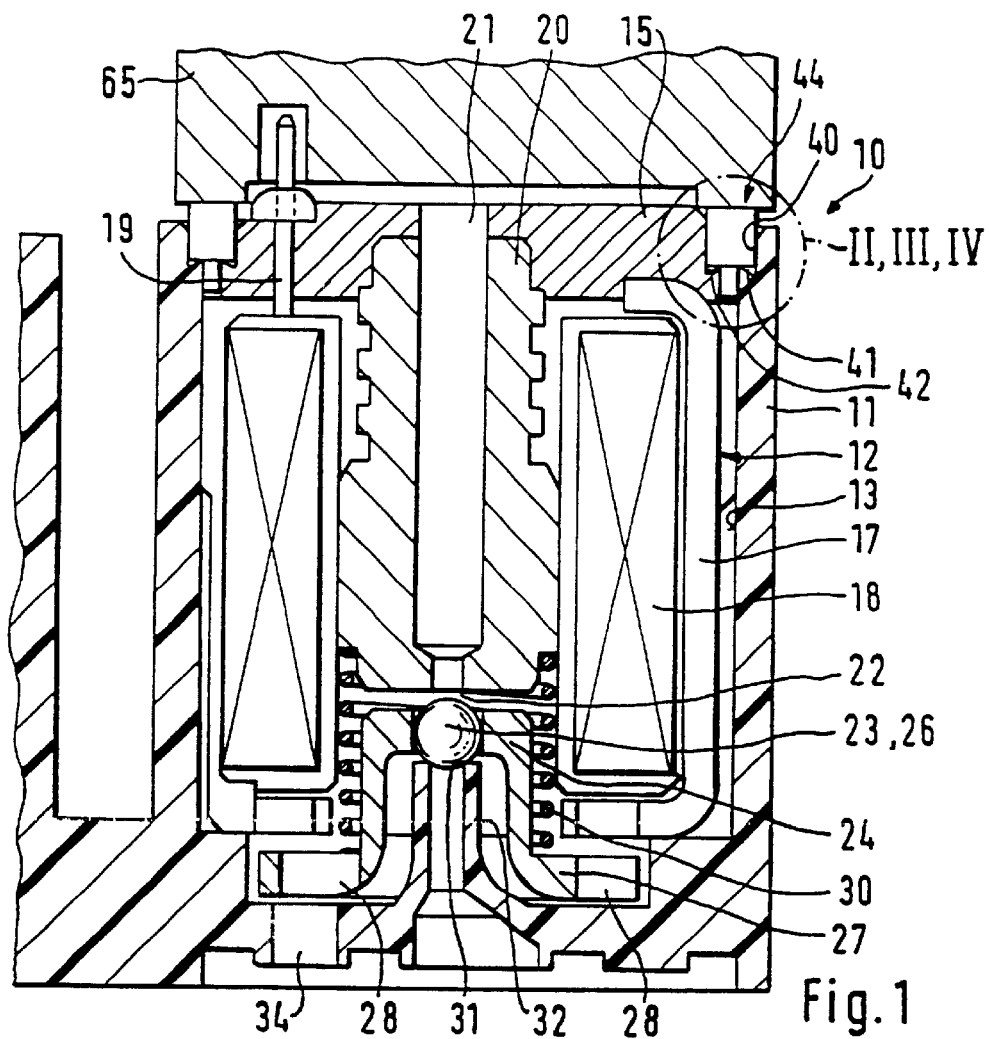
FIG. 1 illustrates a longitudinal section of a pressure-tight assembly in accordance with a first embodiment.

FIG. 1 illustrates a hydraulic unit 10 with a housing 11 made of thermoplastic material and an electromagnetic actuator 12 inserted in the housing in a pressure-tight manner. A recess 13 is made in housing 11, where electromagnetic actuator 12 is inserted. German Offenlegungsschrift No. 195 21 510 describes the operation of hydraulic unit 10.

Electromagnetic actuator 12 has a lid-shaped cover plate 15, which is also made of thermoplastic material, and a magnetic coil 18, cast with a bobbin 17, connected using electric terminals 19. A coil core 20 is inserted in the cylindrical inner space of bobbin 17, which is open on the sides. In the present embodiment, cover plate 15 is formed by the cast material of bobbin 17.

Bobbin 20 is designed with a central longitudinal bore 21, which is connected to a tank (not illustrated) for a pressure medium. A tank-side sealing seat 22 is formed at the end of longitudinal bore 21 located within bobbin 17. Sealing seat 22 interacts with a closing element 23 of a movable armature 24. The cylindrical part of hat-shaped armature 24 traverses bobbin 17. A sphere 26 pressed into the bottom of the hat-shaped armature forms closing element 23. Outside bobbin 17, armature 24 has a flange 27, which is traversed by a plurality of bores 28. One end of armature spring 30, designed as a compression spring, is on flange 27, while the other end is supported by stationary coil core 20. When magnet coil 18 is not energized, armature spring 30 presses armature 24 against a sealing seat 31 on the admission side, which is sealed by closing element 23. Admission side sealing seat 31 is arranged on a tubular admission extension 32 formed on housing 10 and is located on a common longitudinal axis with sealing seat 22 formed on coil core 20. Furthermore, another channel 34, leading to a hydraulic load (not illustrated), is formed in housing 11.

A peripheral, annular gap 40 with a surface 41 on the housing side and a surface 42 on the cover plate side is formed between cover plate 15 and housing 11. An annular insert 44, whose internal face is in contact both with housing-side surface 41 and cover plate-side surface 42, is located in gap 40.

A sonotrode 65 of an ultrasonic welding system, which causes annular insert 44 to vibrate, is on annular insert 44. The thermoplastic material melts due to the ultrasonic vibrations in the area of the support between the internal face of annular insert 44, housing-side surface 41 and cover plate-side surface 42, and thus cover plate 15, insert 44 and housing 11 are welded together.

Figure 2:
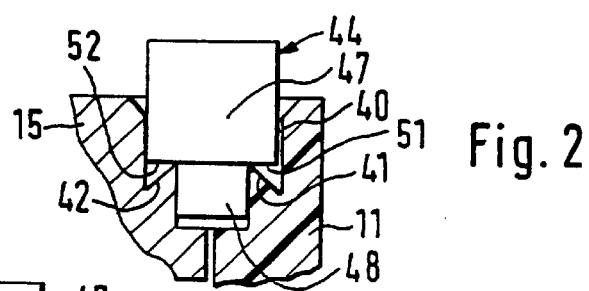
FIG. 2 illustrates an enlarged view of a pressure-tight joint in accordance with the first embodiment.
Figure 3:
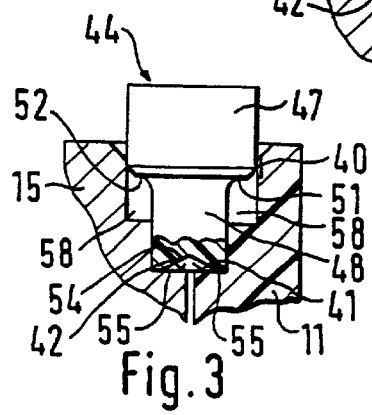
FIG. 3 illustrates the enlarged view of the pressure-tight joint in accordance with a second embodiment.
Figure 4:
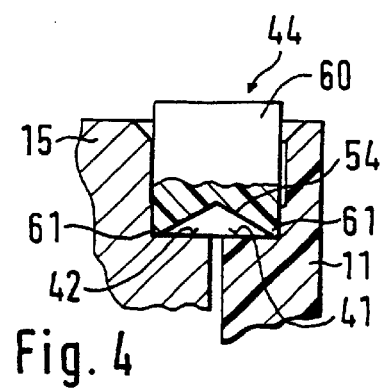
FIG. 4 illustrates the enlarge view of the pressure-tight joint in accordance with a third embodiment.

FIGS. 2, 3, and 4 illustrate an enlarged view of different embodiments of the arrangement for manufacturing the pressure-tight joint. In the first embodiment illustrated in FIG. 2, housing-side surface 41 and cover plate-side surface 42 are inclined, so that a knife-shaped housing-side support 45 is formed on surface 41 and a knife-shaped cover plate-side support 46 is formed on surface 42. Annular insert 44 has an upper, wide annular segment 47 and a lower, narrow annular segment 48, which is set back on both sides. An outer annular surface 51 and an inner annular surface 52 are formed between the annular segments. Annular surfaces 51, 52 of annular insert 44 are thus in contact with the respective knife-shaped supports 45, 46. The action of the ultrasound on insert 44, causes the thermoplastic material in the area of the knife-shaped supports 45, 46 to melt first. Thus the thermoplastic material of both surfaces 41, 42 of gap 40 and on annular surfaces 51, 52 of annular insert 44 is rapidly melted.

A second embodiment is illustrated in FIG. 3, where insert 44 is also constituted by a wide annular segment 47 and a narrow annular segment 48. Outer annular surface 51 and inner annular surface 52 are between the two annular segments 47, 48. A V-shaped notch 54 is made into the front face of narrow annular segment 48, so that two knife-shaped annular surfaces 55 are formed on the front face of annular insert 44. One of the knife-shaped annular surfaces 55 is in contact with cover plate-side surface 42, and the other knife-shaped surface is in contact with housing-side surface 41 of the narrow area of gap 40. A free space 58 is formed between annular surfaces 51, 52 and the adjacent surface in gap 40. Thus the material melted during ultrasonic welding can solidify in the free space, and is not splashed on the surface of housing 11 or cover plate 15. Housing 11, cover plate 15 and insert 44 are welded together on the bottom face of the narrow annular segment 48 in the area of the knife-shaped annular surfaces 55.

FIG. 4 illustrates another embodiment where the annular insert is designed, for example, as a compact ring 60. Ring 60 also has a V-shaped notch 54 on its inner surface, forming two knife-shaped annular surfaces 61 on its outer periphery; one of these surfaces is in contact with housing-side surface 41 and the other is in contact with cover plate-side surface 42. Also in this case, the ultrasonic welding joint is produced in the area of the knife-shaped annular surfaces 55 between housing 11, cover plate 15 and insert 44.

The use of ultrasonic welding is not tied to the described embodiments of gap 40 and insert 44.

What is claimed is:

1. A pressure-tight hydraulic unit, comprising:

a housing having a recess for accommodating a functional unit;

a cover plate closing the recess, the cover plate and the housing forming a peripheral gap having a housing-side surface and a cover plate-side surface; and a separate insert placed in the peripheral gap and with which a pressure-tight joint between the housing and the cover plate is formed, each contact surface of the separate insert being in contact with the housing-side surface and the cover plate-side surface, wherein:

prior to assembly, knife-shaped annular surfaces are formed between the contact surface of the separate insert and the housing-side surface and the cover plate-side surface, and an integral connection is capable of being formed in a region of the knife-shaped annular surfaces via an ultrasonic welding so that, in an assembled state, the separate insert is integrally joined to the housing and the cover plate.

2. The unit according to claim 1, wherein:

the insert has a V-shaped notch on an inner annular surface, so that two knife-shaped annular surfaces are formed on a front face of the insert, one of the two knife-shaped annular surfaces being joined to the housing-side surface and another of the two knife-shaped annular surfaces being joined to the cover plate-side surface.

3. The unit according to claim 1, wherein:

the housing-side surface and the cover plate-side surface are each inclined, so that one knife-shaped support can be formed for the insert in each one of the housing-side surface and the cover plate-side surface.

4. The unit according to claim 1, wherein:

the insert includes an upper, wide annular segment and a lower, narrow annular segment, and a V-shaped notch is molded into a front face of the lower, narrow annular segment.

5. The unit according to claim 4, wherein:

a free space is provided in the peripheral gap below annular surfaces formed between the upper, wide annular segment and the lower, narrow annular segment prior to assembly, where melted material can solidify upon welding.

6. A method of manufacturing a pressure-tight unit, comprising the steps of:

placing a separate insert in a gap between a housing and a cover plate;

placing a sonotrode of an ultrasonic welding system on the separate insert; and welding the separate insert to the housing and the cover plate in a pressure-tight manner in accordance with an ultrasonic welding.

* * * * *